US009414203B2

(12) United States Patent
Paul et al.

(10) Patent No.: US 9,414,203 B2
(45) Date of Patent: Aug. 9, 2016

(54) DEVICE USAGE CONTROLLER AND METHODS THEREOF

(71) Applicant: Synchronoss Technologies, Inc., Bridgewater, NJ (US)

(72) Inventors: Sumeet Paul, Evanston, IL (US); Frank Martino, Wayne, IL (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 69 days.

(21) Appl. No.: 14/207,010

(22) Filed: Mar. 12, 2014

(65) Prior Publication Data

US 2014/0274025 A1    Sep. 18, 2014

Related U.S. Application Data

(60) Provisional application No. 61/793,419, filed on Mar. 15, 2013.

(51) Int. Cl.
| | | |
|---|---|---|
| *H04W 24/00* | (2009.01) | |
| *H04W 4/04* | (2009.01) | |
| *H04M 1/60* | (2006.01) | |
| *H04M 1/725* | (2006.01) | |

(52) U.S. Cl.
CPC ............ *H04W 4/046* (2013.01); *H04M 1/6075* (2013.01); *H04M 1/72569* (2013.01); *H04M 1/72577* (2013.01); *H04M 1/72538* (2013.01); *H04M 2250/52* (2013.01)

(58) Field of Classification Search
CPC ..... H04W 4/027; H04W 4/046; H04W 48/02; H04W 48/04; H04W 4/008; H04W 64/006; H04W 84/005; H04M 1/72577; H04M 1/72569; H04M 2250/12; H04M 1/6075; H04M 2250/52; H04M 1/72538

USPC ........ 455/404.1, 404.2, 456.1–457, 418–420; 340/539.13, 988–996

See application file for complete search history.

(56) References Cited

U.S. PATENT DOCUMENTS

| | | | |
|---|---|---|---|
| 8,538,374 B1 * | 9/2013 | Haimo et al. ............... | 455/404.2 |
| 2005/0261816 A1 * | 11/2005 | DiCroce et al. ................ | 701/36 |
| 2008/0146205 A1 * | 6/2008 | Aaron ................. | H04M 3/4228 455/414.2 |
| 2010/0210301 A1 | 8/2010 | Dietz et al. | |
| 2011/0136509 A1 * | 6/2011 | Osann, Jr. .................. | 455/456.3 |
| 2011/0216060 A1 * | 9/2011 | Weising et al. ............... | 345/419 |
| 2011/0230228 A1 * | 9/2011 | Young et al. ............... | 455/550.1 |
| 2012/0108269 A1 * | 5/2012 | Howarter et al. .......... | 455/456.4 |
| 2013/0141565 A1 * | 6/2013 | Ling ............................. | 348/135 |
| 2013/0336093 A1 * | 12/2013 | Suvanto ................. | G01S 15/06 367/99 |
| 2014/0256303 A1 * | 9/2014 | Jones ............................ | 455/418 |

\* cited by examiner

*Primary Examiner* — Ronald Eisner
(74) *Attorney, Agent, or Firm* — Synchronoss Technologies, Inc.; Frederick W. Dour

(57) ABSTRACT

Embodiments of the present invention are directed to a device usage controller and methods of limiting device usage in a motor vehicle using audio environment and physical vibration information. The controller incorporates a real time audio feed from a microphone and runs through a pattern matching algorithm to determine the likelihood of the device being in a motor vehicle, such as an automobile, through the detection of environmental noise. The controller also incorporates a second data stream sampled from a motion sensor to determine vibration patterns felt by the device. The second data stream can also be used to determine the likelihood of the device being in a motor vehicle. Either one of the two data streams or the two data streams are combined to control or limit access to the device, automatically trigger assistance or both.

14 Claims, 4 Drawing Sheets

DEVICE USAGE CONTROLLER AND METHODS THEREOF

RELATED APPLICATIONS

This application claims benefit of priority under 35 U.S.C. section 119(e) of the U.S. Provisional Patent Application Ser. No. 61/793,419 filed Mar. 15, 2013, entitled "Mobile Applications," which is hereby incorporated by reference in its entirety.

FIELD OF THE INVENTION

The present invention relates to a device usage controller and methods thereof.

BACKGROUND OF THE INVENTION

Distracted driving is driving while doing another activity that takes a driver's attention away from driving. Distractions include, but are not limited to, using a mobile device, eating and drinking, and talking to passengers. However, because using a mobile device such as to text or to surf the web, combines three types of distraction—visual (e.g., taking eyes off the road), manual (e.g., taking hands off the wheel) and cognitive (e.g., taking mind off driving)—it can be the most dangerous distraction. According to distraction.gov, an official U.S. government website for distracted driving, drivers who use handheld devices are 4 times more likely to get into crashes serious enough to injure themselves. This is, in part, because driving while using a cell phone reduces the amount of brain activity associated with driving by 37%. Studies show that headset use is not substantially safer than handheld use. Although these facts and statistics are powerfully persuasive, drivers still reach for and/or use mobile devices while driving. Each day, more than 15 people are killed and more than 1,200 people are injured in crashes that are reported to involve a distracted driver.

Prior art solutions that promote safe driving by limiting use of a mobile device exist today. One solution requires hardware equipment to be installed in a vehicle. The hardware equipment communicates with a mobile device and informs the mobile device that the vehicle is moving based on readings of the vehicle's speedometer. Usage of the mobile device is limited when the vehicle is in motion. There are issues with this solution. First, this solution is typically expensive as it requires installation of new hardware in the vehicle and software in the mobile device. Second, this solution can be easily disabled or bypassed. Third, this solution is limited to the vehicle that the equipment is installed in. Fourth, this solution indiscriminately turns off or limits usage of the mobile device for everyone in the vehicle.

Another solution uses G.P.S. information of a mobile device. Usage of the mobile device is limited when the mobile device is in motion. There are also issues with this solution. For example, it doesn't matter whether the mobile device is actually being used by the driver or a passenger. This solution also indiscriminately turns off or limits usage of the mobile device for everyone in the vehicle.

The present invention addresses at least these limitations in the prior art.

SUMMARY OF THE INVENTION

Embodiments of the present invention are directed to a device usage controller and methods of limiting device usage in a motor vehicle using audio environment and physical vibration information. The controller incorporates a real time audio feed from a microphone and runs through a pattern matching algorithm to determine the likelihood of the device being in a motor vehicle, such as an automobile, through the detection of environmental noise. The controller also incorporates a second data stream sampled from a motion sensor to determine vibration patterns felt by the device. The second data stream can also be used to determine the likelihood of the device being in a motor vehicle. Either one of the two data streams or the two data streams are combined to control or limit access to the device, automatically trigger assistance or both.

In one aspect, a non-transitory computer-readable medium storing instructions that, when executed by a mobile device, cause the computing device to perform a method is provided. The method includes determining location of the mobile device within a motor vehicle, and controlling the mobile device based on at least the location of the mobile device. In some embodiments, the controlling of the mobile device is dependent on motion of the mobile device.

In some embodiments, the location of the mobile device within the motor vehicle is determined by sending and receiving inaudible pings. Alternatively or in addition, the location of the mobile device within a motor vehicle is determined by analyzing pictures captured by a camera coupled with the mobile device.

In some embodiments, the mobile device is controlled by disabling a set of functions of the mobile device. For example, the set of functions includes receiving and sending calls, text messages or both. For another example, the set of functions also includes receiving and sending email messages, browsing the web or both.

In some embodiments, the method further includes using an audio sensor communicatively coupled with the mobile device to receive a real time audio feed. The real time audio feed can be used to control the mobile device.

In some embodiments, the method further includes using a motion sensor communicatively coupled with the mobile device to determine a vibration pattern from vibrations detected. The vibrations can be used to control the mobile device.

In some embodiments, the method further includes using a visual sensor communicatively coupled with the mobile device to capture images. The captured images can be used to control the mobile device.

In some embodiments, the method further includes analyzing data gathered by a vibration sensor and an audio sensor of the mobile device to detect occurrence of a driving event, and automatically triggering a first help service. In some embodiments, the first help service requires user input. If no user input is received within a predetermined period, such as within 2 minutes of the triggering of the first help service, a second help service is automatically triggered. In some embodiments, the method further includes automatically taking at least one of pictures and a video of a surrounding of the mobile device to be sent to one or more help services, such as the first help service and/or the second help service.

In another aspect, a non-transitory computer-readable medium storing instructions that, when executed by a mobile device, cause the computing device to perform a method is provided. The method includes detecting an active hands-free system communicatively coupled with the mobile device, determining location of the hands-free system within a motor vehicle, and controlling the mobile device based on at least the location of the hands-free system. An exemplary control of the mobile device based on at least the location of the hands-free system is disabling communication with the hands-free system.

The hands-free system, such as a stereo system, can be part of the motor vehicle. Alternatively, the hands-free system, such as a headset, is separate from the motor vehicle. In some embodiments, the hands-free system is wirelessly coupled with the mobile device.

In some embodiments, the hands-free system is detected by the mobile device sending inaudible pings and recognizing that the pings are picked up by an audio sensor that is external to the mobile device.

In yet another aspect, a non-transitory computer-readable medium storing instructions that, when executed by a mobile device, cause the computing device to perform a method is provided. The method includes receiving a first data stream of audio from a mobile device, receiving a second data stream of motion from the mobile device, and determining whether the mobile device is in motion based on analysis of the first data stream and the second data stream.

In yet another aspect, a non-transitory computer-readable medium storing instructions that, when executed by a mobile device, cause the computing device to perform a method is provided. The method includes receiving a first data stream of audio from a mobile device, receiving a second data stream of motion from the mobile device, analyzing the first data stream and the second data stream, and automatically triggering a help service based on the analysis.

In yet another aspect, a mobile device includes an accelerometer and a non-transitory computer-readable medium storing instructions that, when executed by the mobile device, cause the mobile device to perform a method is provided. Typically, the method includes receiving a first data stream from a microphone, receiving a second data stream from the accelerometer, and controlling at least one feature of the mobile device based on the first data stream and the second data stream.

The microphone can be native to the mobile device. Alternatively, the microphone is external to the mobile device.

In some embodiments, the method also includes recognizing a pattern of vibrations, sounds, or a combination thereof, detecting an occurrence of an unusual driving event based on the recognition, and triggering at least one help service.

In some embodiments, the mobile device includes a camera. The at least one feature of the mobile device that is controlled is the camera. The camera is activated to automatically take at least one of a picture and a video.

In yet another aspect, a system includes a network, and a server coupled with the network. The server stores operating instructions. The system also includes a mobile device. The mobile device typically includes an application configured to send to the server a first data stream from a microphone coupled with the mobile device. In some embodiments, the first data stream is periodically sampled in 2-5 second lengths. The application is also configured to send to the server another data stream(s) from an accelerometer coupled with the mobile device, if present, and/or from a camera coupled with the mobile device, if present. The application is also configured to receive from the server at least one of the instructions to control usage of the mobile device.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed to a device usage controller and methods of limiting device usage in a motor vehicle using audio environment and physical vibration information. The controller incorporates a real time audio feed from a microphone and runs through a pattern matching algorithm to determine the likelihood of the device being in a motor vehicle, such as an automobile, through the detection of environmental noise. The controller also incorporates a second data stream sampled from a motion sensor to determine vibration patterns felt by the device. The second data stream can also be used to determine the likelihood of the device being in a motor vehicle. Either one of the two data streams or the two data streams are combined to control or limit access to the device, automatically trigger assistance or both.

Figure 1:
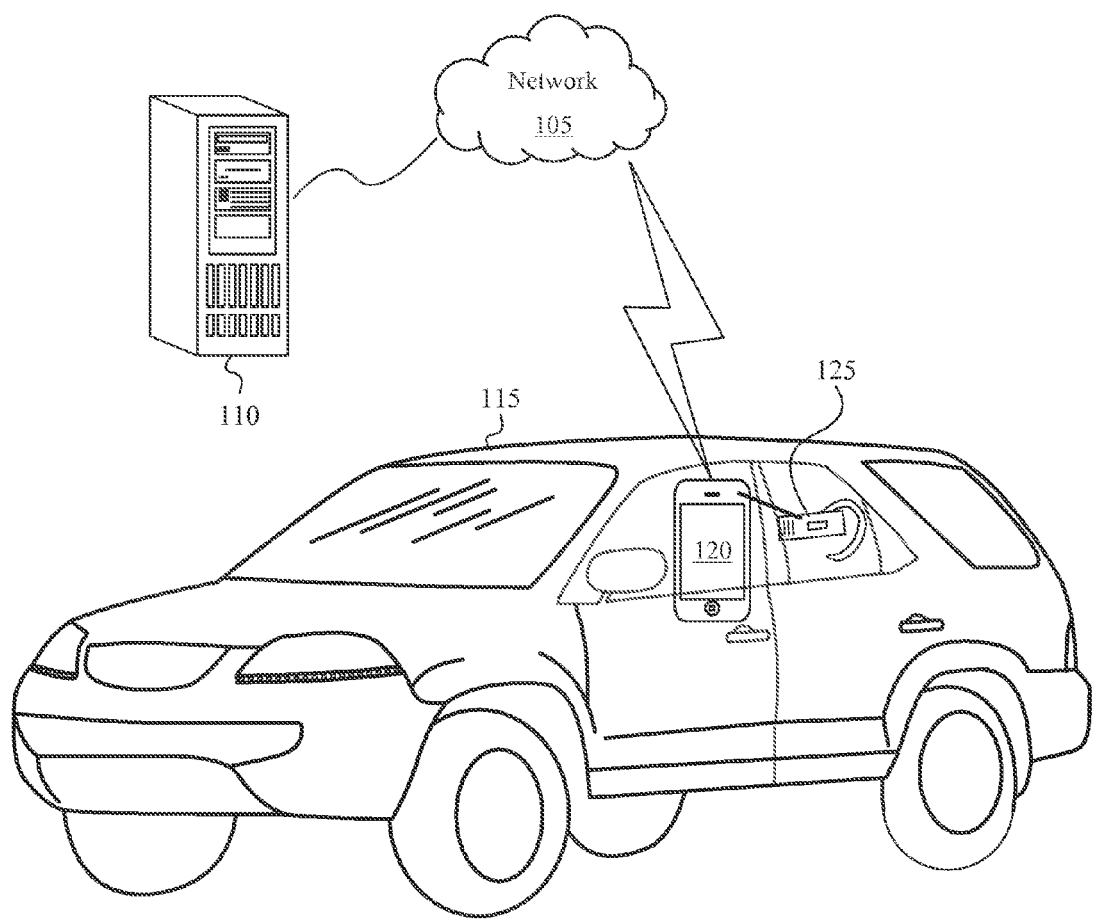
FIG. 1 illustrates a general overview of a system for implementing an embodiment of the present invention.

FIG. 1 illustrates a general overview of a system 100 for implementing an embodiment of the present invention. As shown in FIG. 1, a server 110 and mobile device 120 are communicatively coupled with a network 105. It will be understood that the network 105 can be a cellular network maintained by a cellular carrier, such as a GSM or CDMA network, and/or some other wireless communications link. The server 110 can be owned by the cellular carrier. Data can be transmitted over the network 105 in any number of known formats. The mobile device 120 can send and receive data to and from the server 110. In some embodiments, the server 110 determines whether the mobile device is in motion. In some embodiments, the server 110 accesses instructions to control or limit access to a device, such as the mobile device 120. The server 110 can access other necessary data to carry out this solution. These instructions and/or necessary data are stored in an internal or external data store coupled with the server 110.

Figure 2:
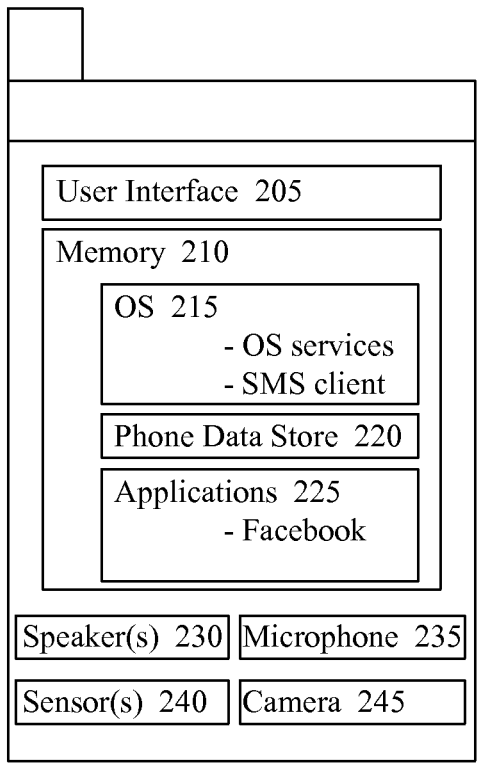
FIG. 2 illustrates a graphical representation of an exemplary mobile device in accordance with the present invention.

FIG. 2 illustrates a graphical representation of an exemplary mobile device 200 in accordance with the present invention. The mobile device 200 is capable of being communicatively coupled to the network 105 of FIG. 1 to transmit voice and data communications to other components, such as other mobile devices or servers (e.g., server 110 of FIG. 1), communicatively coupled with the network 105. In general, a hardware structure suitable for implementing the mobile device 200 includes system memory 210 which may further include an operating system (OS) 215 having operating system services including telephony and linking services, networking services, multimedia and graphics display services all provided to a user interface (UI) 205. The OS 215 may be the mobile terminal's proprietary OS, BREW, or any other device or operating system suitable for a phone. The OS 215 also provides an SMS client built into the OS 215 allowing short messages to be provided across the network 105 to and from other users. The mobile device 200 includes a native phone data store 220 which contains an address book of contacts and other information which may be provided by a user. Such information can further include ringtones, pictures, sounds, and movies, all dependent on the functional capabilities of the mobile device 200, the space allowed in the system memory 210, and the services provided by the OS 215. Applications 225, such as an email client or the Facebook® mobile application or a game application, are also loaded into the mobile device 200.

Other components in the mobile device 200 include, but are not limited to, speaker(s) 230, a microphone 235, sensors 240, and a camera 245. The sensors 240 can be, for example, an accelerometer and a G.P.S. Other sensors are possible. The mobile device 120 can be a smart phone or any other cellular device.

Returning to FIG. 1, although only one server 110 is illustrated, a plurality of servers 110 can be coupled with the network 105. Similarly, although only one mobile device 105 is illustrated, a plurality of mobile device 105 can be coupled with the network 105. It is contemplated that one or more servers 110 can service one or more mobile devices 105. The server 110 can be in communication with one or more data stores (not illustrated). The mobile device 120 can belong to a driver or a passenger of a motor vehicle, such as an automobile 115, and can thus be located within the motor vehicle.

In use, the mobile device 120 can be coupled with a headset 125, either wirelessly (e.g., Bluetooth®) or via a wire. The headset 125 typically includes headphone(s) combined with a microphone. Similarly, in use, the mobile device 120 can be coupled with a stereo system (not illustrated) within the motor vehicle 115. The stereo system includes speaker(s) and a microphone. When coupled, a user is able to use the external microphone, such as the microphone of the headset 125 or the stereo system, for communication.

In some embodiments, the mobile device 105 is able to send data to the server 110, and to remotely receive a response from the server 110 for controlling or limiting use of the mobile device 105. For example, as discussed below, the mobile device 105 sends to the server 110 a first data stream from a microphone coupled with the mobile device 105. In addition or alternatively, the mobile device 105 can also send to the server 110 a second data stream from an accelerometer coupled with the mobile device 105. In addition or alternatively, the mobile device 105 can also send to the server 110 a third data stream from a camera coupled with the mobile device 105. In some embodiments, one or more of the data streams are sent in real time to the server 110 to determine how to control or limit use of the mobile device 105. Alternatively, the mobile device 105 contains the necessary logic to locally determine how to control or limit use of the mobile device 105 based on one or more of the data streams. In both cases, the mobile device 105 is ultimately controlled or limited based on what its current environment is. Controlling or limiting use of the mobile device 105 can include simply locking the screen, disabling one or more applications to prevent access to, for example, a web browser, an email client or a SMS client, or limiting outbound calls to only emergency calls or a set of preselected numbers only, automatically trigger assistance or the like.

Figure 3:
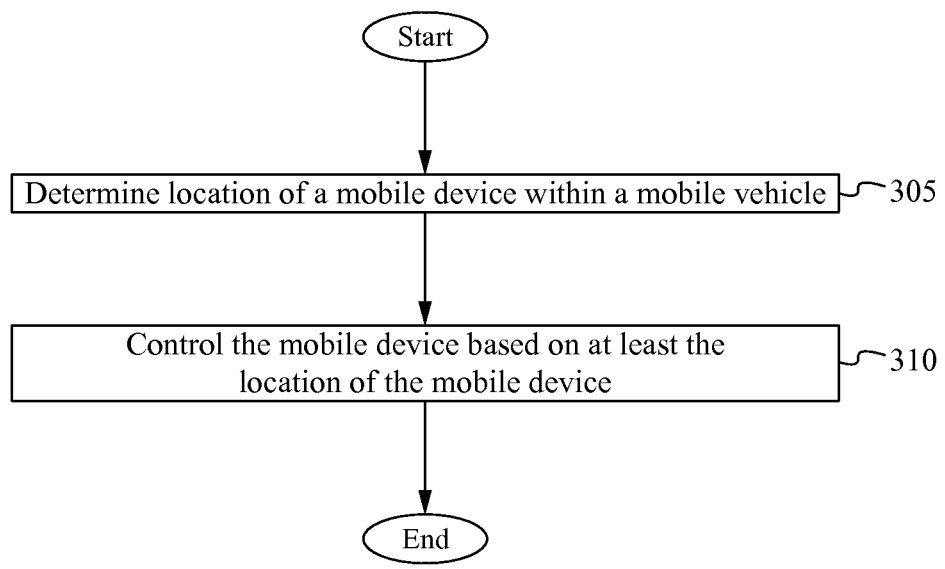
FIG. 3 illustrates an exemplary method of controlling use of a mobile device in accordance with the present invention.

FIG. 3 illustrates an exemplary method 300 of controlling use of a mobile device in accordance with the present invention. In some embodiments, it is first determined that the mobile device is in a moving motor vehicle before method 300 begins. In some embodiments, one or more data streams are used to make such a determination. In particular, an audio sensor, such as a microphone, coupled with the mobile device is enabled. A real time audio feed from the microphone is sampled in short lengths (e.g., 2 to 5 seconds) over regular intervals (e.g., once per 15 seconds). This first data stream is run through a proprietary matching algorithm to determine the likelihood of the mobile device being in a moving motor vehicle. Road noise for motor vehicles, such as buses, airplanes, and the like, can be specifically excluded from the pattern matching. In some embodiments, if a mobile device has a native vibration sensor, such as an accelerometer, a second data stream is sampled from the accelerometer to determine a vibration pattern felt by the mobile device. The second data stream can also be used to determine the likelihood of the mobile device being in a motor vehicle, because vibrations associated with an activity, such as driving a car, riding a bicycle or running, are typically distinct. One or both of these data streams can be used to determine if the mobile device is indeed in a moving motor vehicle. This determination can be made locally on the mobile device or remotely on a server that accesses a data store of collected environmental noises and compares/analyzes the data streams with the data in the data store. The server can be same as or different from the server 110 in FIG. 1. If the likelihood of the mobile device being in a moving motor vehicle is greater than the likelihood of the mobile device not being in a moving motor vehicle, then the method 300 begins a step 305.

At the step 305, a location of the mobile device within the motor vehicle is determined. In some embodiments, the mobile device uses its speaker and microphone to send out and listen to inaudible pings to determine where in the motor vehicle the mobile device is. Put differently, echolocation is used to determine how far the mobile device is away from a variety of objects. For example, if glass is detected on the left side of the mobile device, and a steering wheel and glass are detected on the front side of the mobile device, then it is likely that the mobile device is located in the driver seat of the left-hand drive motor vehicle.

In some embodiments, the mobile device uses its camera to capture images. Analysis is performed on the captured images to determine where in the motor vehicle the mobile device is. The analysis can determine if the mobile device is near the steering wheel or at another location, such as a passenger seat, in the motor vehicle. The analysis can implement an object recognition algorithm.

In some embodiments, as long as the mobile device is detected as being within the motor vehicle, the location of the mobile device is periodically determined because the mobile device could be passed from the front of the motor vehicle to the back of the motor vehicle.

At a step 310, the mobile device is controlled based on at least the location of the mobile device. In some embodiments, the mobile device is controlled based on instructions stored locally thereon to control or limit access of the mobile device. Alternatively, the mobile device is controlled based on instructions retrieved remotely from the server 110 to control or limit access of the mobile device. In some embodiments, the location information is sent to the server 110 for processing. The mobile device can be controlled or limited, for example, by locking the screen to prevent use of the mobile device, or disabling a set of functions, such as disabling receiving and sending call, text messages and/or email messages, and/or browsing the web. For another example, the mobile device can be controlled or limited to just making emergency calls. A variety of controls or limitations is possible and can depend on a configuration or preferences determined a user and/or a regulation agency. After the step 310, the method 300 ends.

In some embodiments, occurrence of an unusual driving event can also be detected by further using data from the audio sensor (e.g., microphone), the vibration sensor (e.g., accelerometer) and/or the visual sensor (e.g., camera) coupled with the mobile device. Once an unusual driving event is detected, in some embodiments, assistance is automatically triggered to help the driver since the driver could be in distress.

Figure 4:
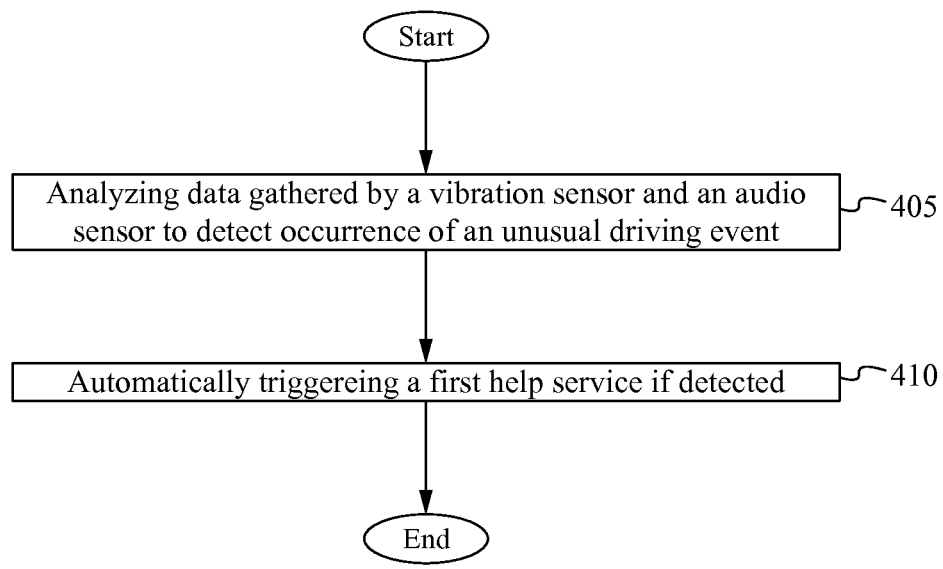
FIG. 4 illustrates an exemplary method of triggering assistance in accordance with the present invention.

FIG. 4 illustrates an exemplary method 400 of triggering assistance in accordance with the present invention. The method 400 begins at a step 405. At the step 405, data from the microphone, the accelerometer and/or the camera are continuously being analyzed to determine whether there is an occurrence of an unusual driving event. In some embodiments, a pattern indicating an unusual driving event can be recognized from the data. For example, the mobile device is able to detect that the driver is no longer on the road because the driver has hit a rumble strip (e.g., based on vibration), is in an off road situation (e.g., based on vibration and road noise), and has crashed (e.g., based on sound of windows shattering). This analysis can be made locally on the mobile device or remotely on a server by continuously sending the server the one or more data streams from the microphone and the accelerometer. The server can be the same as or different from the server 110 of FIG. 1.

At a step 410, a first help service is automatically triggered when an unusual event is triggered. For example, the mobile device can be instructed to beep or ring to get the driver's attention. In some embodiments, the first help service requires user input. As such, if the driver does not respond to the beep or ring within a predetermined period, such as within one minute, a second help service is automatically trigger. For example, the mobile device can automatically text or call for help, either to 9-1-1 or a preselected number. In some embodiments, the camera coupled with the mobile device is automatically activated and starts taking pictures and/or capturing a video of the surrounding. In some embodiments, these stills and/or footage can be automatically sent to a predetermined destination. After the step 410, the method 400 ends.

As discussed above, the mobile device can be used with a hands-free system, such as a headset or a stereo system of an automobile. A hands-free system can be communicatively coupled with the mobile device to transmit audio from voice calls, music and video files, and the like. In some embodiments, usage of the mobile device is based on the location of the user using the mobile device, or more specifically the location of an active hands-free system, to prevent the driver from talking on the mobile device, rather than based on the location of the mobile device since the driver can be using a headset while the mobile phone is located in the backseat.

Figure 5:
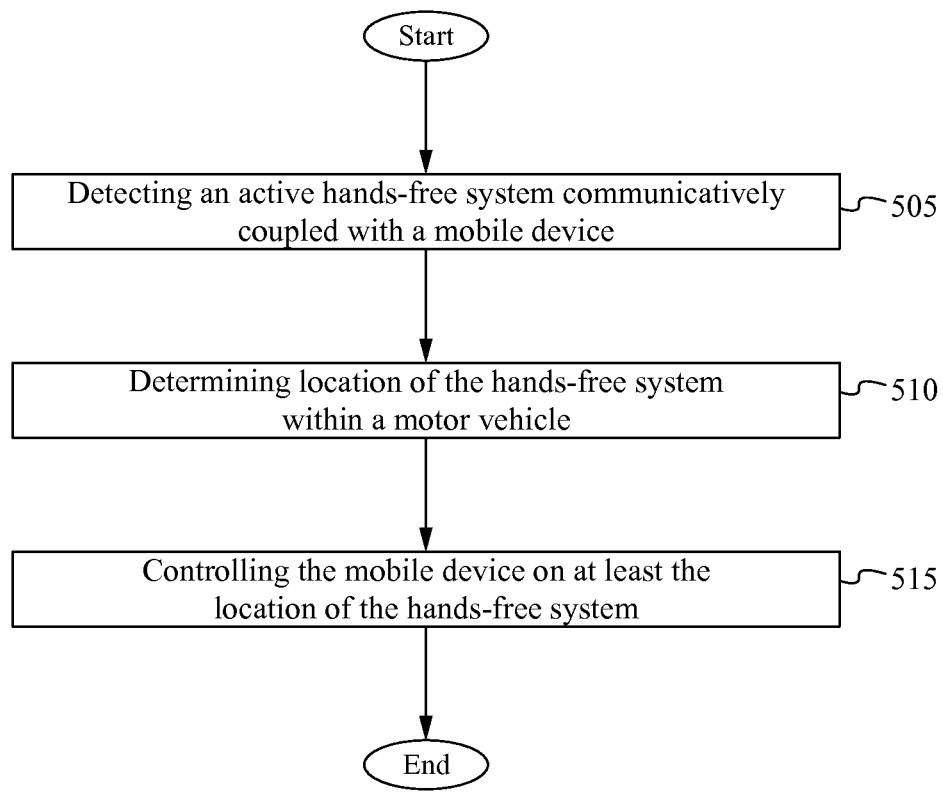
FIG. 5 illustrates an exemplary method of controlling use of a mobile device in accordance with the present invention.

FIG. 5 illustrates an exemplary method 500 of controlling use of a mobile device in accordance with the present invention. The method 500 begins at a step 505. At the step 505, an active hands-free system communicatively coupled with the mobile device is detected. In some embodiments, when the mobile device sends out inaudible pings, the mobile device is able to recognize that the pings are not being picked up by the mobile device's native microphone but are being picked up by a microphone that is external to or nonnative with the mobile device. Alternatively, the hands-free system coupled with the mobile device can simply be detected via software, hardware or a combination thereof, of the mobile device.

At a step 510, location of the hands-free system within the motor vehicle is determined. In some embodiments, two tests are run to determine the location of the hands-free system. In the first run, the native microphone is turned on and the external microphone is turned off, and the mobile device sends pings and the native microphone listens for the pings. In the second run, the native microphone is turned off and the external microphone is turned on, and the mobile device sends pings and the external microphone listens for the pings. The order of the first run and the second run is not important as long as both tests are run. Since the mobile device knows its location within the motor vehicle, the mobile device can determine an approximate location of the hands-free system based on the distance between the mobile device and the hands-free system.

At a step 515, the mobile device is controlled based on at least the location of the hands-free system. In some embodiments, the mobile device is controlled based on instructions stored locally thereon to control or limit access of the mobile device. Alternatively, the mobile device is controlled based on instructions retrieved remotely from the server 110 to control or limit access of the mobile device. In some embodiments, the location information is sent to the server 110 for processing. The mobile device can be controlled or limited, for example, by locking the screen to prevent use of the mobile device, or disabling a set of functions, such as disabling receiving and sending call, text messages and/or email messages, and/or browsing the web. For another example, the mobile device can be controlled or limited to just making emergency calls. A variety of controls or limitations is possible and can depend on a configuration or preferences determined a user and/or a regulation agency. After the step 515, the method 500 ends.

Figure 6:
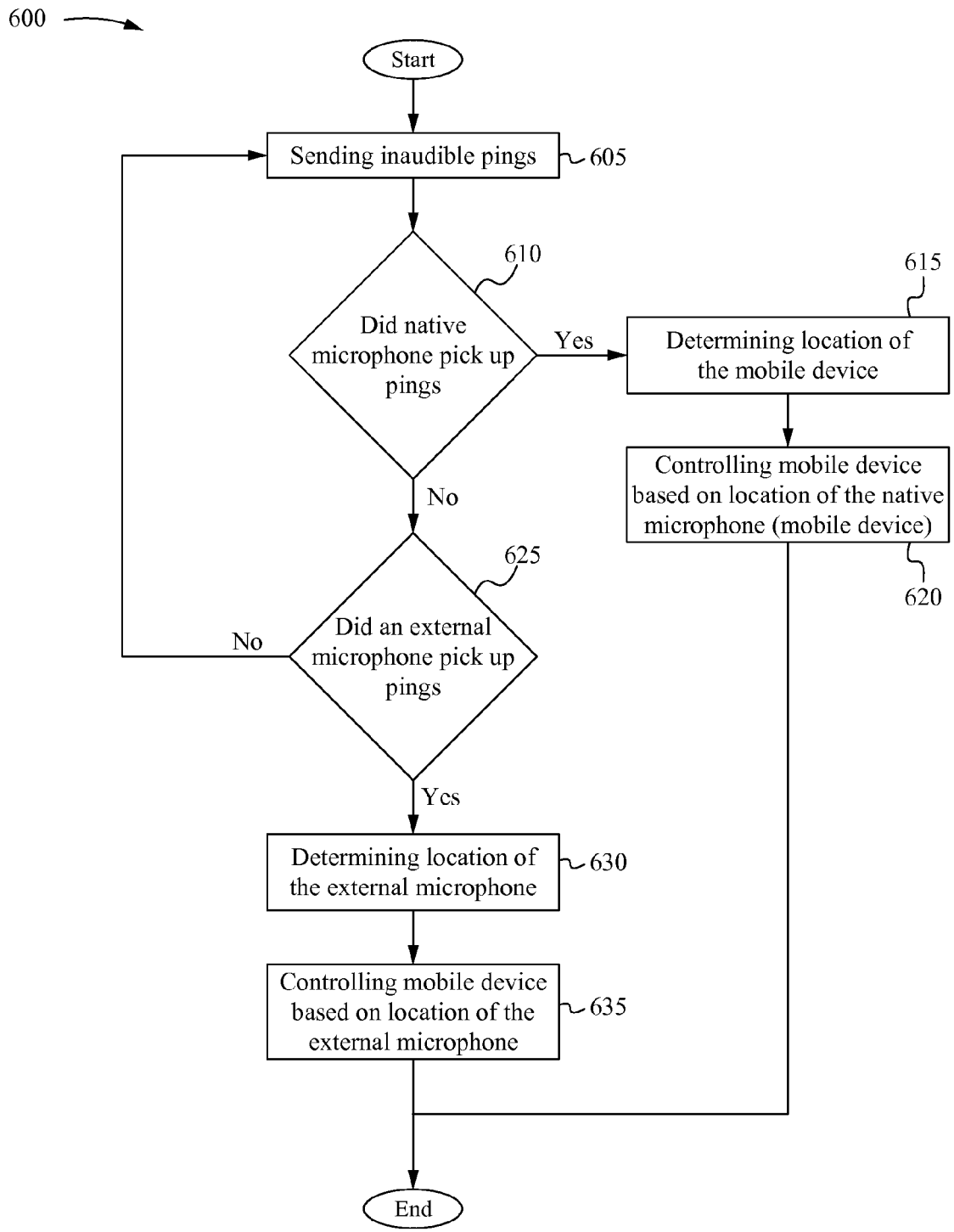
FIG. 6 illustrates an exemplary method of controlling use of a mobile device in accordance with the present invention.

FIG. 6 illustrates an exemplary method 600 of controlling use of a mobile device in accordance with the present invention. The method 600 begins at a step 605. At the step 605, the mobile device sends one or more inaudible pings. At a step 610, it is determined whether a native microphone has picked up the one or more pings. If a yes determination is made at the step 610, then at a step 615, the location of the mobile device is determined. At a step 620, the mobile device is controlled or limited based on the location of the native microphone/mobile device. After the step 620, the method 600 ends.

If a no determination is made at the step 610, then at a step 625, it is determined whether an external microphone picked up the one or more pings. If a no determination is made at the step 625, then the method returns to the step 605. If a yes determination is made at the step 625, then at a step 630, the location of the external microphone is determined. At a step 635, the mobile device is controlled or limited based on the location of the external microphone. After the step 635, the method 600 ends.

Embodiments of the present invention requires no integration with the motor vehicle. In some embodiments, the solution is preinstalled as part of the device firmware image, thereby making removal and bypass by the device user difficult. This solution advantageously does not require any administrative privileges or any special hardware. This solution advantageously allows subscribers (e.g., parents) to better their children by limiting access to their children's mobile devices while the children are driving, without having to install hardware devices.

It is contemplated that this solution is also able to create an opportunity for a new revenue stream for carriers. A carrier can offer this solution to its subscribers as a service for a monthly fee. It is further contemplated that this solution can be enforced by a regulation agency. For example, a law can require that people under the age of 18 who have mobile devices must have this solution running on their mobile devices by subscribing to the service. When they turn 18, they opt out of this service.

It should be noted that the solution has been discussed as being provided by a phone manufacturer (e.g., preinstalled as part of the device firmware image), it is contemplated that the solution can include an application that is downloaded and installed at a later time. To download and install the application, a user, for example, selects the application from offerings provided by a source, such as a service provider, a carrier, or an enterprise service, and installs the application on the mobile device.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a mobile device, cause the mobile device to perform a method comprising:
   assessing by the mobile device whether the mobile device is inside a moving motor vehicle;
   based on an assessment by the mobile device that the mobile device is inside the moving motor vehicle, determining by the mobile device a location of where inside the moving motor vehicle the mobile device is, wherein determining comprises sending by the mobile device inaudible pings that cannot be heard by humans; and
   controlling the mobile device according to at least the location of the mobile device.

2. The non-transitory computer-readable medium of claim 1, wherein determining by the mobile device a location of where inside the moving motor vehicle the mobile device is includes analyzing pictures captured by a camera coupled with the mobile device.

3. The non-transitory computer-readable medium of claim 1, wherein controlling the mobile device includes disabling a set of functions of the mobile device.

4. The non-transitory computer readable medium of claim 3, wherein the set of functions includes disabling receiving and sending at least one of calls and text messages.

5. The non-transitory computer readable medium of claim 3, wherein the set of functions includes disabling at least one of receiving and sending email messages and browsing the web.

6. The non-transitory computer readable medium of claim 1, wherein the controlling of the mobile device is dependent on motion of the mobile device.

7. The non-transitory computer readable medium of claim 1, further comprising using an audio sensor communicatively coupled with the mobile device to receive a real time audio feed, wherein the real time audio feed is used to control the mobile device.

8. The non-transitory computer readable medium of claim 1, further comprising using a motion sensor communicatively coupled with the mobile device to determine a vibration pattern from vibrations detected, wherein the vibrations are used to control the mobile device.

9. The non-transitory computer-readable medium of claim 1, further comprising using a visual sensor communicatively coupled with the mobile device to capture images, wherein the capture images are used to control the mobile device.

10. The non-transitory computer readable medium of claim 1, further comprising:
    a. analyzing data gathered by a vibration sensor and an audio sensor of the mobile device to detect occurrence of a driving event; and
    b. automatically triggering a first help service.

11. The non-transitory computer readable medium of claim 10, wherein the first help service requires user input.

12. The non-transitory computer readable medium of claim 11, further comprising automatically triggering a second help service if no user input is received within a predetermined period.

13. The non-transitory computer-readable medium of claim 10, further comprising automatically taking at least one of pictures and a video of a surrounding of the mobile device to be send to one or more help services.

14. A non-transitory computer-readable medium storing instructions that, when executed by a mobile device, cause the mobile device to perform a method comprising:
    assessing by the mobile device whether the mobile device is inside a moving motor vehicle;
    based on an assessment by the mobile device that the mobile device is inside the moving motor vehicle, using echolocation to periodically determine a current location of where inside the moving motor vehicle the mobile device is, wherein using comprises sending inaudible pings by the mobile device inaudible pings that cannot be heard by humans to determine how far the mobile device is away from a plurality of objects within the motor vehicle; and
    controlling the mobile device according to at least the location of the mobile device, wherein controlling the mobile device includes disabling a set of functions of the mobile device.

* * * * *